(12) United States Patent
Boschma

(10) Patent No.: US 8,467,307 B2
(45) Date of Patent: Jun. 18, 2013

(54) SIGNAL QUALITY DETERMINATION IN CABLE NETWORKS

(75) Inventor: Jeroen Jacob Boschma, Leiden (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 568 days.

(21) Appl. No.: 12/528,575

(22) PCT Filed: Feb. 27, 2008

(86) PCT No.: PCT/NL2008/050118
§ 371 (c)(1), (2), (4) Date: Oct. 30, 2009

(87) PCT Pub. No.: WO2008/105660
PCT Pub. Date: Sep. 4, 2008

(65) Prior Publication Data
US 2010/0094602 A1    Apr. 15, 2010

(30) Foreign Application Priority Data
Feb. 28, 2007 (EP) .................................. 07103242

(51) Int. Cl.
*H04J 1/16* (2006.01)
(52) U.S. Cl.
USPC ............ 370/252; 332/123; 375/346; 455/295
(58) Field of Classification Search
USPC ............ 370/252; 332/123; 375/346; 455/295
See application file for complete search history.

(56) References Cited

U.S. PATENT DOCUMENTS

| | | | | |
|---|---|---|---|---|
| 5,265,151 A * | 11/1993 | Goldstein | .................. | 379/93.32 |
| 5,758,271 A * | 5/1998 | Rich et al. | .................. | 455/234.1 |
| 6,216,100 B1 * | 4/2001 | Meghdadi et al. | ............. | 703/15 |
| 2004/0165678 A1 | 8/2004 | Nadiri | | |
| 2006/0023125 A1* | 2/2006 | Zeidler | .......................... | 348/731 |
| 2008/0039045 A1* | 2/2008 | Filipovic et al. | .............. | 455/295 |

FOREIGN PATENT DOCUMENTS

| | | |
|---|---|---|
| CN | 2631159 Y | 8/2004 |
| JP | 06-012466 A | 1/1994 |
| JP | 11-191716 A | 7/1999 |
| JP | 2001-506391 A | 5/2001 |
| RU | 2153234 C2 | 7/2000 |
| RU | 2159010 C2 | 11/2000 |
| WO | WO 98/41018 A1 | 9/1998 |

OTHER PUBLICATIONS

Ushida et al., "Frequency response of nonlinear networks using curve tracing algorithm" Database Inspec [Online]; The Institution of Electrical Engineers, Stevenage, GB; May 29, 2002, Database Accession No. 7432069.

(Continued)

*Primary Examiner* — Luat Phung
(74) *Attorney, Agent, or Firm* — Leydig, Voit & Mayer, Ltd.

(57) ABSTRACT

A method of determining signal quality in a cable network comprises the steps of: providing a network model (1) comprising an interconnection model (2) and component models (3), providing an input signal (IS), determining an output signal (OS) using the input signal and the network model, and determining the signal quality from the input signal (IS) and the output signal (OS). The input signal (IS) comprises multiple constituent signal components, each signal component representing a class of input signals. The step of determining the output signal involves determining intermodulations of the constituent signal components by effecting frequency domain convolutions of the spectra of the constituent signal components.

16 Claims, 4 Drawing Sheets

OTHER PUBLICATIONS

Kundert, Kenneth, "Chapter 5 Fourier Analysis of The designer's Guide of Spice and Spectre" 1995, paragraph [5.1.1.2]; Figure 5.1.

International Search Report for PCT/NL2008/050118 dated Jun. 13, 2008.

* cited by examiner

SIGNAL QUALITY DETERMINATION IN CABLE NETWORKS

FIELD OF THE INVENTION

The present invention relates to determining signal quality in cable networks. More in particular, the present invention relates to a method of and device for determining signal quality in a cable network using a network model.

BACKGROUND

It is well known to determine signal quality parameters of electrical or optical networks, including cable networks such as CATV (Cable television) networks. Parameters or measures indicative of the signal quality at the receiving end (typically the subscriber end) of the network are, for example, the signal-to-noise ratio (SNR) and, in digital networks, the bit error ratio (BER). By determining the noise level (and/or another property) of the output signal, an indication of the signal quality at the receiving end of the network can be obtained.

A cable network contains cables, amplifiers and other components. Cables or wires have relatively little influence on the signal quality, but they attenuate high frequency components. Amplifiers typically introduce noise. It will be understood that the noise of a number of amplifiers arranged in series, as used in typical cable networks, accumulates and may affect the actual signal.

In addition, amplifiers introduce signal distortion due to non-linearities. Ideally, an amplifier outputs the input signal $s(t)_{in}$ multiplied by a gain factor:

$$s(t)_{out} = A \cdot s(t)_{in}$$

where the gain A is constant. In practice, however, amplifiers are not perfectly linear and the output signal will typically contain higher powers of the input signal, including quadratic and cubic terms:

$$s(t)_{out} = A \cdot s(t)_{in} + B \cdot s(t)_{in}^2 + C \cdot s(t)_{in}^3 + \ldots$$

As a result of this non-linearity, so-called intermodulations of input signal frequencies will cause the output signal to contain frequency components that were not present in the input signal. These undesired intermodulations lower the signal quality and should therefore be taken into consideration when determining the signal quality of a network.

However, conventional methods typically fail to take these intermodulations into account. Even when intermodulations are taken into account, they are typically lumped together, thus failing to accurately determine their individual contributions to the overall signal quality level.

The paper "Frequency Response of Nonlinear Networks using Curve Tracing Algorithm" by A. Yoshida, Y. Yamagami & Y. Nishio, IEEE, May 2002, discloses a method of calculating the characteristic curves of non-linear circuits. Although non-linear effects are taken into account, only the fundamental frequency components are taken into account. Accordingly, the impact of intermodulation on only a single frequency is considered, making the known method unsuitable for determining the intermodulation effects of frequency bands. In addition, said Prior Art paper fails to refer to cable networks.

SUMMARY OF THE INVENTION

It is an object of the present invention to overcome these and other problems of the Prior Art and to provide a method of and a device for determining signal quality in a cable network which provide more accurate results.

Accordingly, the present invention provides a method of determining signal quality in a network, the method comprising the steps of:
  providing a network model comprising interconnections and at least one component model,
  providing an input signal,
  determining an output signal using the input signal and the network model, and
  determining a signal quality measure using the input signal and the output signal,
characterised in that
  the network model is a model of a cable network, such as a cable television network,
  the input signal comprises multiple frequency domain representations of constituent signal components,
  the output signal comprises a frequency domain representation of a cable network output signal, and in that
  the step of determining the output signal involves:
    using the network model to simulate the behaviour of the cable network in response to the input signal,
    determining frequency domain intermodulations by effecting convolutions of spectra of the constituent signal components, and
    using the frequency domain intermodulations, in addition to the output signal, to produce the signal quality measure.

By using an input signal having multiple constituent signal components, the contributions of each of those components to the intermodulations, and hence to the signal quality, can be accurately determined. By further simulating the behaviour of the cable network in response to the input signal having a plurality of constituent signal components, a very realistic result is achieved.

By determining frequency domain intermodulations by effecting convolutions of spectra of the constituent signal components, both single frequency signal components and frequency components having a non-vanishing bandwidth can be processed. The ability to determine the intermodulations of signal components or signals having non-zero bandwidths is a significant advantage over the Prior Art.

In addition, by using the frequency domain intermodulation, in addition to the output signal, to produce the signal quality measure it is ensured that the signal quality measure takes both the desired output signal and the intermodulations into account. As a result, a very reliable signal quality measure is obtained which can be used for a wide range of input signals and a wide range of cable networks.

The intermodulations resulting from the constituent signal components are preferably determined separately by effecting individual convolutions, and as a consequence the impact of intermodulations on the signal quality of the network can be determined very accurately.

As stated above, the frequency domain intermodulations are determined by effecting convolutions of spectra of the constituent signal components. However, in practice the convolutions require a large amount of processing power. Accordingly, it is preferred that each convolution of spectra of constituent signal components is effected by carrying out an inverse Fourier transform, a multiplication in the time domain, and a Fourier transform. In other words, although effectively frequency domain convolutions are carried out, these convolutions are practically carried out by time domain multiplications, which are much more efficient than convolutions. As is well known, forward and backward (that is, inverse) Fourier transforms can be carried out very efficiently using the FFT (Fast Fourier Transform).

The network model preferably is a frequency domain model, having components which directly affect the spectra of the signals. This has the advantage that frequency domain signal specifications can be used. As signals used in cable networks, such as CATV networks, are typically specified in the frequency domain, for example by stating their central frequency and their bandwidth, such specifications can be used directly to determine the input signal of the model.

In a preferred embodiment, the component model comprises a gain unit, weighing units, and at least one intermodulation unit for determining the component's gain contribution, frequency dependencies and intermodulation contributions respectively. Such a component model makes an accurate modeling of the component's characteristics possible.

It is further preferred that the component model comprises at least two intermodulation units for determining second order and third order intermodulations respectively. Although component models can be used which take only second order or third order intermodulations into account, including both second order and third order intermodulations significantly improves the modeling. Fourth or higher order intermodulations may also be modeled using higher order intermodulation units, but the resulting increase in computational complexity is typically not outweighed by the increase in accuracy of the model.

It is also preferred that the at least one intermodulation unit is preceded by a primary weighing unit for weighing the input signal prior to determining the intermodulations, and is followed by a secondary weighing unit for weighing the intermodulations. Although it is possible to use only a single weighing unit in each branch, using a weighing unit both before and after the intermodulation unit provides a more accurate model.

The at least one intermodulation unit preferably comprises intermodulations sub-units for determining intermodulations of the constituent signal components.

The present invention also provides a computer program product for carrying out the method as defined above. A computer program product may comprise a set of computer executable instructions stored on a data carrier, such as a CD or a DVD. The set of computer executable instructions, which allow a programmable computer to carry out the method defined above, may also be available for downloading from a remote server, for example via the Internet.

The present invention additionally provides a device for determining signal quality in a network, the device comprising:
  a memory unit for storing a network model comprising interconnections and at least one component model,
  an input unit for providing an input signal,
  a processing unit for determining an output signal using the input signal and the network model, and
  a signal quality unit for determining a signal quality measure using the input signal and the output signal,
characterised in that
  the network model stored in the memory unit is a model of a cable network, such as a cable television network,
  the input unit is arranged for receiving an input signal comprising multiple frequency domain representations of constituent signal components,
  the processing unit is arranged for determining an output signal comprising a frequency domain representation of a cable network output signal, and in that
  the processing unit is further arranged for determining the output signal by:
    using the network model to simulate the behaviour of the cable network in response to the input signal,
    determining frequency domain intermodulations by effecting convolutions of spectra of the constituent signal components, and
    using the frequency domain intermodulations, in addition to the output signal, to produce the signal quality measure.

BRIEF DESCRIPTION OF THE DRAWINGS

The present invention will further be explained below with reference to exemplary embodiments illustrated in the accompanying drawings, in which.

DETAILED DESCRIPTION OF THE DRAWINGS

Figure 1:
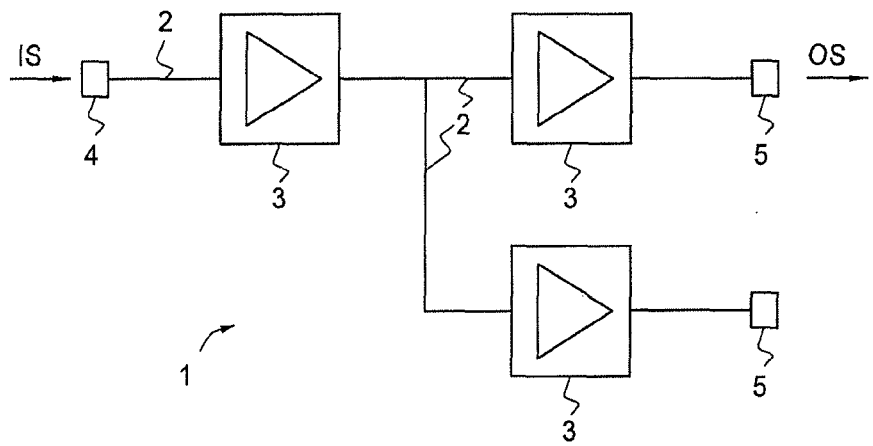
FIG. 1 schematically shows an exemplary network model as used in the present invention.

The network model 1 shown merely by way of non-limiting example in FIG. 1 comprises interconnections 2, component models 3, an input terminal 4 and output terminals 5. The network model 1 represents an actual cable network (not shown) that consists of three interconnected amplifiers and that has a single input terminal and two output terminals.

Such networks models are known per se and allow cable operators to determine the signal quality at the output terminals 5. The models provide an indication of the noise contributions of the amplifiers in the presence of an input signal to the network. The signal quality determined at the output terminals 5 is indicative of the quality of service experienced by the subscribers.

Conventional methods are often based on frequency-independent linear amplifier models and fail to take the frequency-dependent properties and the full effects of the non-linear properties of amplifiers into account. This is in particular a problem when wideband and/or multiple input signals are used, as is typically the case in modern cable networks. Any non-linearities of the amplifiers will result in intermodulation components: new frequency components that result from non-linear amplification of the input signals. For example, input frequencies $f_1$ and $f_2$ produce, when using a typical amplifier, additional frequencies $f_1+f_2$ and $f_1-f_2$. These additional signal components are undesired and contribute to the total noise level in the output signal.

However, conventional network models typically assume amplifiers to be perfectly or approximately linear and thereby fail to take all added noise due to intermodulations into account. This may result in noise estimates which are significantly lower than the actual noise level. As a result, the quality of service experienced by the subscribers is lower than expected. The present invention solves this problem by providing an improved component model.

Figure 2:
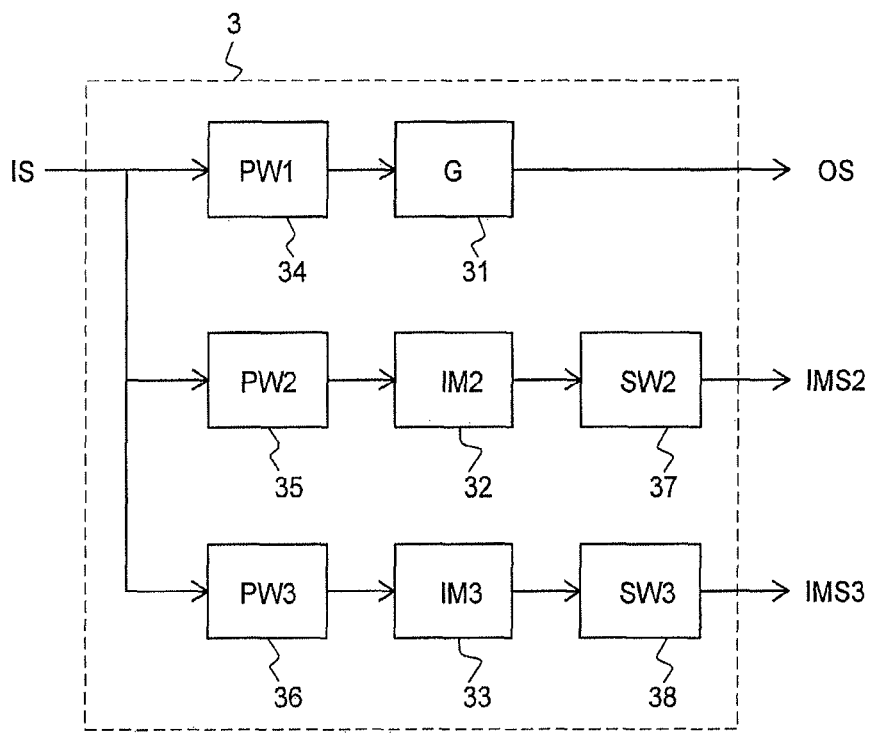
FIG. 2 schematically shows a component model in accordance with the present invention.

A component model according to the present invention is schematically illustrated in FIG. 2. The merely exemplary component model 3 comprises a gain (G) or linear amplification unit 31, intermodulation (IM) or non-linear amplification units 32 and 33, primary weighing (PW) units 34, 35 and 36, and secondary weighing (SW) units 37 and 38. The component model 3 receives an input signal IS and outputs an output signal OS. At least one of the signals IS and OS may be identical to its respective counterpart IS or OS of FIG. 1, but this is not necessary.

The gain (G) unit 31 models the linear gain of the network component, typically an amplifier. This gain is independent of frequency. The first primary weighing (PW1) unit 34 applies a frequency domain weighing of the input signal IS, attenuating some frequencies more than other frequencies. This feature makes it possible to model the frequency-dependent transmission characteristics of the network components and hence of the actual network. As is well known, in cable networks the signal attenuation typically increases with frequency.

The second-order intermodulations (IM2) unit 32 determines the intermodulations resulting from second-order (that is, quadratic) terms in the amplification characteristics (or, in general, transmission characteristics) of the network component. The second-order intermodulation unit 32 is preceded by a second primary weighing (PW2) unit 35 and followed by a second secondary weighing (SW2) unit 37 which both provide frequency-dependent weighing of the input signal IS and the second-order intermodulations respectively. The weighing unit 37 outputs a second-order intermodulation signal IMS2.

Only a single weighing unit before or after the intermodulation unit 32 could be used to provide frequency-dependent weighing. However, in accordance with a further aspect of the present invention, it is preferred that both the primary and the secondary weighing units are provided. In this way, a better weighing and a more accurate modeling of the network component is achieved.

It is noted that in the embodiment of FIG. 2 only a single weighing unit 34 is arranged in series with the gain unit 31, since providing two weighing units in the linear branch of the component model would offer no benefits. In this embodiment, therefore, only a (first) primary weighing (PW1) unit 34 is present, the secondary weighing unit being omitted. It will be understood that instead of the primary weighing unit 34 a secondary weighing unit could be present.

The third-order intermodulations (IM3) unit 33 determines the intermodulations resulting from third-order (that is, cubic) terms in the amplification characteristics (or, in general, transmission characteristics) of the network component. The third-order intermodulation unit 33 is preceded by a third primary weighing (PW3) unit 36 and followed by a third secondary weighing (SW3) unit 38 which both provide frequency-dependent weighing of the input signal IS and the third-order intermodulations respectively. The weighing unit 38 outputs a third-order intermodulation signal IMS3.

Again, only a single weighing unit before or after the intermodulation unit 33 could be used to provide frequency-dependent weighing, but in accordance with the present invention it is preferred to use both weighing units in the third-order intermodulations branch of the model.

The intermodulation units 32 and 33 will now be described in more detail with reference to FIGS. 3 & 4. In accordance with an important aspect of the present invention, the input signal (IS in FIG. 1) used comprises multiple constituent components, each constituent component representing a signal class. For example, the input signal could comprise two or more of the following components:
PAL (Phase Alternating Line): television signals.
FM (Frequency Modulation): radio signals.
QAM (Quadrature Amplitude Modulation): data transmission
SPAL: (synchronised PAL): television signals.
OFDM (Orthogonal Frequency Division Multiplexing): data transmission.
Carriers: network measuring and control signals.

These input signals are provided in a frequency domain (that is, spectral) representation. In the example of FIGS. 3 & 4, only two input signal components P and Q are shown, but in practice more than two input signal components may be used.

Figure 3:
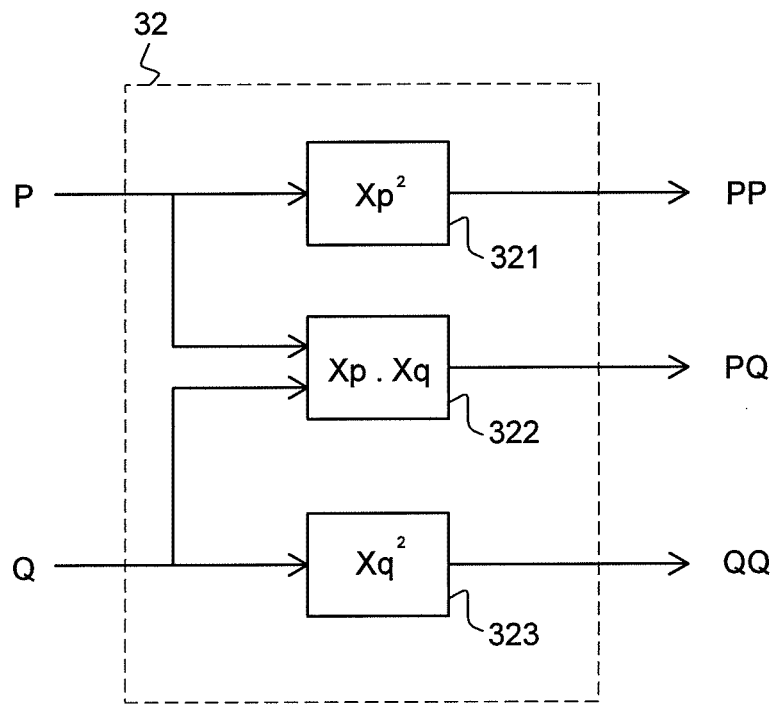
FIG. 3 schematically shows a first intermodulation unit in accordance with the present invention.

The (second-order) intermodulation unit 32 of FIG. 3 is shown to comprise intermodulations sub-units 321, 322, & 323 for determining intermodulations of the constituent signal components. The first sub-unit 321 receives only the signal component P and produces the intermodulation of the component P with itself, symbolically written as $x_P^2$, to produce the intermodulation component PP. Similarly, the third sub-unit 323 receives only the signal component Q and produces the intermodulation of this component Q with itself, symbolically written as $x_Q^2$, to produce the intermodulation component QQ.

The second sub-unit 322, however, receives both the signal component P and the signal component Q to produce the "true" intermodulation of the components P and Q, symbolically written as $x_P \cdot x_Q$, to produce the intermodulation component PQ. Accordingly, the intermodulations of the constituent signal components are determined separately by the sub-units. By separately determining the intermodulation components, a very accurate representation of the intermodulation and hence a very accurate signal quality estimation is obtained.

As the input signal (IS in FIG. 1) is provided as a spectrum (frequency domain representation), the constituent signal components P & Q and the intermodulation components PP, PQ & QQ are frequency domain signal representations.

Figure 4:
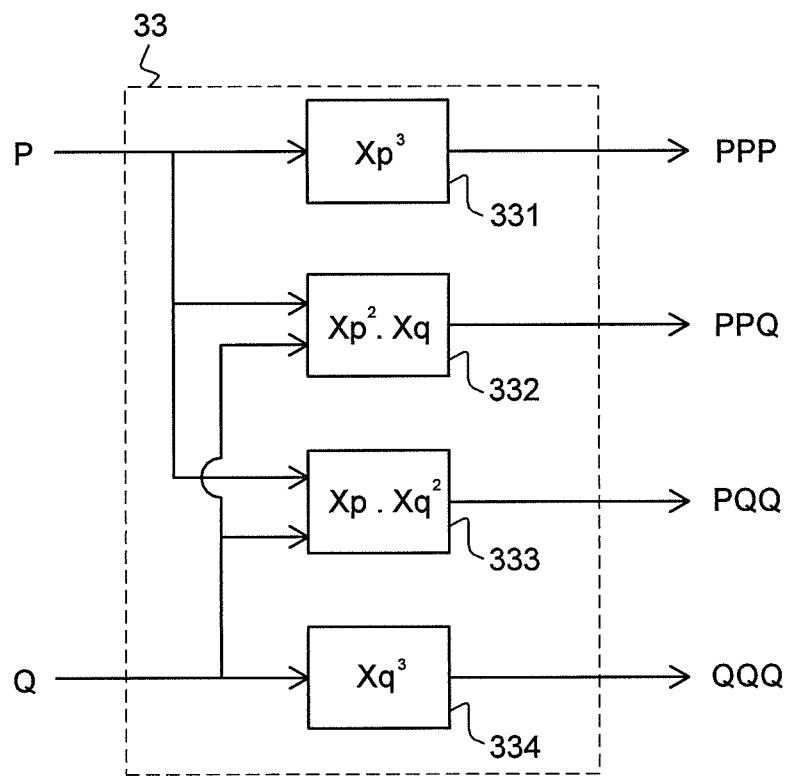
FIG. 4 schematically shows a second intermodulation unit in accordance with the present invention.

The (third-order) intermodulation unit 33 of FIG. 4 is shown to comprise intermodulations sub-units 331, 332, 333 & 334 for determining intermodulations of the constituent signal components P and Q. The first sub-unit 331 receives only the signal component P and produces the (third-order) intermodulation of the component P with itself, symbolically written as $x_P^3$, to produce the intermodulation component PPP. Similarly, the fourth sub-unit 334 receives only the signal component Q and produces the intermodulation of this component Q with itself, symbolically written as $x_Q^3$, to produce the intermodulation component QQQ.

The second sub-unit 332, however, receives both the signal component P and the signal component Q to produce the intermodulation component PPQ. Similarly, the third sub-unit 333 produces the intermodulation component PQQ.

It can be seen that the intermodulation unit 32 determines separate intermodulation components PPP, PPQ, PQQ and QQQ from the constituent input signal components P and Q. As mentioned above, the signal components P and Q are frequency domain signals or, more specifically, frequency domain representations of time signals. The products $x_P^3$, $x_P^2 \cdot x_Q$ etc. are time domain products which can be calculated in the frequency domain using a computationally demanding convolution procedure. For this reason, the units 32 and 33 preferably comprise a fast Fourier transform (FFT) unit for (inversely) transforming the frequency domain signal components P and Q to the time domain and transforming the time domain products $X_P^3$, $X_P^2 \cdot X_Q$ etc. back to the frequency domain to obtain the frequency domain intermodulation components PP, ..., QQ or PPP, ... QQQ.

It is noted that the network model (1 in FIG. 1), the component models (3 in FIG. 2), the intermodulation units 32 & 33 and their sub-units may be implemented in hardware, in software, or a combination of hardware and software. The software is preferably suitable for running on a conventional computer system.

Figure 5:
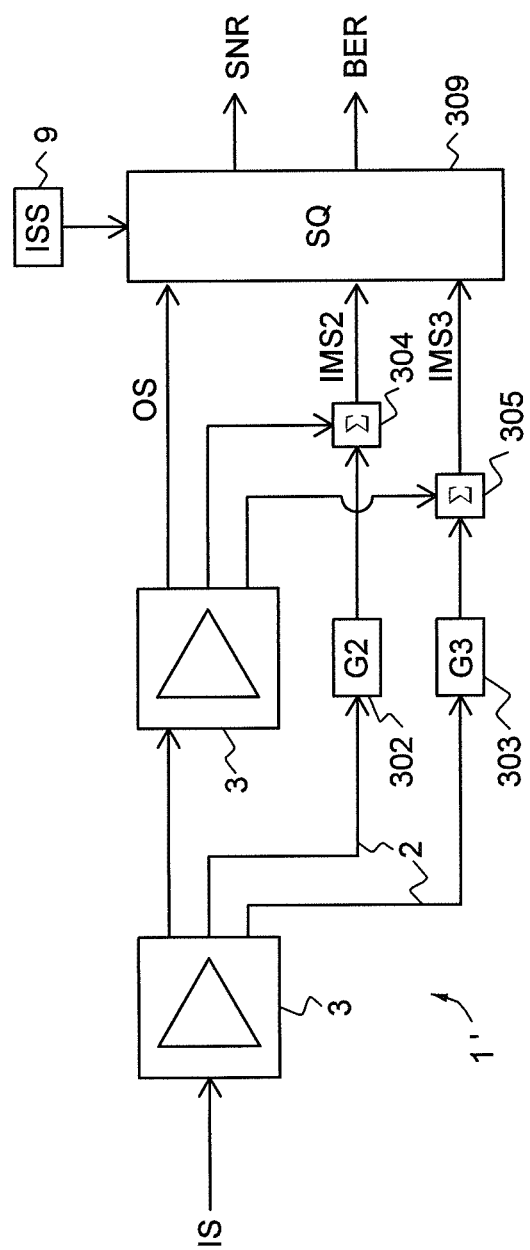
FIG. 5 schematically shows a method and arrangement for determining signal quality in a cable network in accordance with the present invention.

The determination of the signal quality in accordance with the present invention is illustrated in FIG. 5. A network model 1' represents a cable network having two amplifier units. The corresponding component models 3 each have three outputs, as in FIG. 2, producing an output signal OS, a second-order intermodulation signal IMS2 and a third-order intermodulation signal IMS3 respectively. The output signal of the first component model 3 is fed to the second component model for amplification, while its intermodulation signals are fed to gain (G) adjustment units 302 and 303. The gain adjusted intermodulation signals of the first component model are added to the intermodulation signals of the second component model in the summation units 304 and 305 respectively to produce the aggregate intermodulation signals IMS2 and IMS3.

The gain adjustment units 302 and 303 are shown as separate units for adjusting the gain of the second-order intermodulations (G2) and the third-order intermodulations (G3) respectively. In other embodiments a single, combined gain adjustment unit could be used. The gains of the gain adjustment units 302 and 303 correspond to the respective gains of all further components (amplifiers) in the network model. In the example shown, the gain adjustment units 302 and 303 have gains equal to the gain of the second amplifier model 3. In addition to gain adjustment, the units 302 and 303 preferably also carry out a frequency adjustment, that is, a frequency weighing. This weighing is equal to the weighing of all further component models. Accordingly, in the embodiment shown, the intermodulations are frequency weighed (and gain adjusted) as if they passed through the second component model 3.

The output signal OS of the second component model, the second-order intermodulations signal IMS2 and the third-order intermodulations signal IMS3 are fed separately into a signal quality (SQ) unit 309 which produces, in the embodiment shown, the signal-to-noise ratio (SNR) and the bit error ratio (BER) of the signals.

The intermodulation signals IMS2 and IMS3 each consist of constituent intermodulation signals, for example the constituent signals PPP, PPQ, etc. of FIG. 4. In the signal quality unit 309, the constituent signals are added separately. That is, the PPP contributions from both amplifier models 3 of FIG. 5 are added to form an aggregate PPP contribution, the PPQ contributions are added to form an aggregate PPQ contribution, etc. Then the SNR and/or BER are calculated, using the aggregate contributions, the output signal OS and specifications of the input signals (for example QAM, PAL and FM signals) used to produce the input signal IS. These input signal specifications (ISS) are contained in a stored list 9 of specifications and may include (carrier) frequencies, signal levels, bandwidths, and other parameters. The derivation of the (frequency domain) input signal IS from the input signal specifications ISS of list 9 will later be explained with reference to FIG. 6.

In addition to the impact of the intermodulations on the signal quality level, noise modeling may additionally be used. Conventional noise modeling may be used, assuming thermal noise at the input of the model. The gains and weighing characteristics of the component models, optionally including any noise figures representing noise introduced by the components, are used to determine an output noise level which is contained in the output signal OS fed to the signal quality unit 309.

The processing illustrated in FIG. 5 is preferably executed in software, but may also be implemented in hardware.

The component models (3 in FIGS. 1, 2 & 5) contain parameters, for example gain parameters and weighing parameters. These parameters may be determined using the arrangement of FIG. 6, which may be embodied in software and/or in hardware.

A component model unit 3, which in the embodiment shown models an amplifier, receives model parameters (pars). These parameters are produced in the parameter adjustment (PA) unit 7, as will be explained later. The component model unit 3 receives a (frequency domain) input signal IS from an input signal generator (ISG) unit 8, which in turn receives input signal specifications (ISS) from a stored input signal specifications list 9. As mentioned above, the input signal specifications may comprise (carrier) frequencies, bandwidth, power levels, and/or other parameters. The input signal used by the model 3 may be a set of digital data representing a physical input signal, or may be an actual digital input signal.

The input signal generator (ISG) unit 8 generates the frequency domain input signal IS using input signal specifications such as (central) frequency, bandwidth, power level, (spectral) envelope, and/or other parameters. Signal generators capable of generating an input signal on the basis of these and similar parameters are known per se.

The input signal specifications (ISS) are also fed to a second input signal generator (ISG) unit 8' which generates a physical (frequency domain) input signal IS' which is fed to an actual component (in the present example an amplifier) 3'.

The model unit 3 outputs a composite output signal containing the basic output signal (OS) and the intermodulation signals IMS2 and IMS3. Similarly, the component unit 3 outputs a composite output signal containing the basic output signal (OS') and the intermodulation signals IMS2' and IMS3'. These signals are received and compared by a comparison unit 6. Any difference between the computed signals produced by the model 3 and the measured signals produced by the actual component 3' results in a difference signal DS which is fed to the parameters adjustment unit 7.

The parameters adjustment unit 7 determines the model parameters of the component model, in particular the weighing parameters of the weighing units (34-36 & 37-38 in FIG. 2). The weighing units preferably comprise second-order polynomial weighing functions (not to be confused with the second-order intermodulations) having the general formula:

$$W(f)_{out} = A \cdot f^2 + B \cdot f + C,$$

where $W(f)_{out}$ is the (frequency domain) output signal of the weighing unit, f is the frequency and where A, B and C are weighing parameters. The parameters adjustment unit 7 determines these weighing parameters, for example using a genetic optimisation algorithm which may be known per se. Other optimisation algorithms, such as grid search algorithms known per se, may also be used.

Figure 6:
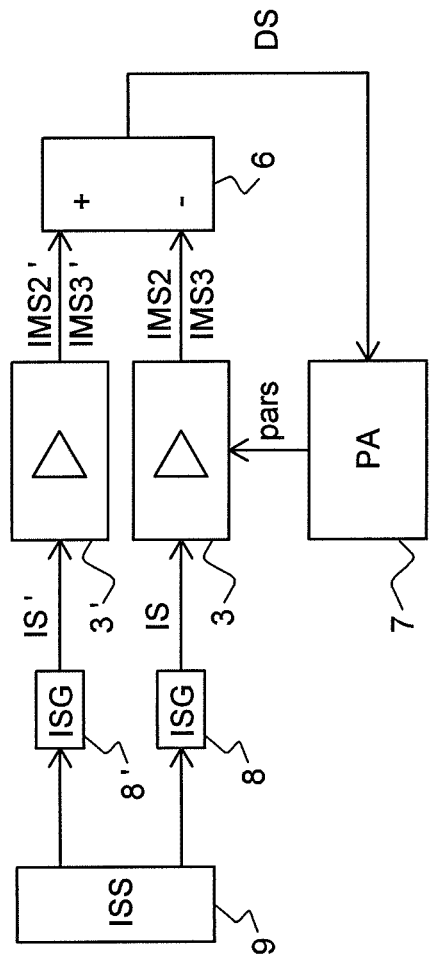
FIG. 6 schematically shows a method and arrangement for updating a network model in accordance with the present invention.

It is noted that adjusting the weighing parameters of the weighing units using a comparative test as illustrated in FIG. 6 is not essential and therefore optional. Instead, the weighing parameters could be predetermined, thus omitting the optimisation using the comparative test.

A genetic optimisation algorithm may include the step of defining initial parameters and creating a number of parents each having a gene structure corresponding to the initial parameters. The parents are then ranked according to a fitness criterion: producing the smallest difference signal DS. The highest ranking parents are then combined to form one or more children. Suitable children replace lower ranking parents to form new parents. The process is then repeated by combining the highest ranking parents in an effort to further optimise the parameters. Various steps in the genetic algorithm can be repeated until optimal parameters producing a minimum difference signal are obtained.

A comparative test as illustrated in FIG. 6 may optionally also be used for tuning a network model, that is, adjusting parameters of the model of the complete cable network. In this case, the component model 3 is replaced with a network model (1 and 1' in FIGS. 1 and 5 respectively), while the actual component 3' is replaced with the actual network.

In particular, the comparative test arrangement may be used to adjust the relative contributions of the constituent intermodulation signals (intermodulation components), for example PP, PQ, . . . , QQ, and PPP, PPQ, . . . , QQQ. According to a further aspect of the present invention, the addition of these intermodulation components in the summation units 304 & 305 illustrated in FIG. 5 is controlled by parameters. In the case of second-order and third-order intermodulations, two parameters A2 and A3 (and auxiliary variables k and n) may be used:

$$IMS2_{TOTAL} = (\Sigma[IMS2^{k/2}])^{2/k}, \text{ with } k=(30-A2)/10$$

$$IMS3_{TOTAL} = (\Sigma[IMS3^{n/2}])^{2/n}, \text{ with } n=(30-A3)/10$$

where the default values are A2=10 (power addition) and A3=20 (amplitude addition), resulting in k=2 and n=1 respectively, and where $\Sigma$ represents a summation over all available (power spectrum) components of IMS2 and IMS3. After the summation, $IMS2_{TOTAL}$ and $IMS3_{TOTAL}$ represent the aggregate power spectra of the second-order and third-order intermodulation components respectively.

However, it is preferred to adjust the additional intermodulation summation parameters using a comparative test, in which case the values of A2 and A3 will typically deviate from the initial values of 10 and 20 respectively in order to obtain a better "fit" of the network model. For the optimisation process a grid search algorithm known per se may be used, as such an algorithm is in the present case more efficient than a genetic algorithm. Other optimisation algorithms, including genetic algorithms, may however be used instead.

A device for determining signal quality in a cable network may comprise an input unit for inputting suitable input signals, a memory unit for storing a network model and its parameters, a processing unit for processing the input signals using the network model, and a signal quality unit for determining the signal quality from the input signal, the output signal and the intermodulations. The processing unit, which may comprise a microprocessor, is coupled to the input unit, the memory unit and the signal quality unit.

Although the present invention has been discussed above with reference to cable networks, such as CATV networks, the invention is not so limited and may also be applied to other electrical or optical networks, for example broadband (Internet) networks. Cable networks may include, but are not limited to, coaxial networks, fibre networks, and hybrid fibre-coaxial (HFC) networks.

The present invention is based upon the insight that separately determining the intermodulation contributions of various signal components results in a better estimate of the intermodulations and of the overall noise level in network. The present invention benefits from the further insights that frequency weighing of the amplified signals and intermodulations improves the accuracy of the modeling, and that a genetic algorithm may advantageously be used to optimise network model parameters, in particular the parameters of a component model used for determining intermodulation contributions.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A method of determining signal quality in a network, the method comprising the steps of:
   providing a network model comprising interconnections and at least one component model, the component model comprising a gain unit, weighing units, and at least one intermodulation unit for determining a component's gain contribution, frequency dependencies and intermodulation contributions respectively;
   providing an input signal;
   determining an output signal using the input signal and the network model;
   determining a signal quality measure using the input signal and the output signal;
   wherein:
      the network model is a model of a cable network,
      the input signal comprises multiple frequency domain representations of constituent signal components,
      the output signal comprises a frequency domain representation of a cable network output signal, and
      the step of determining the output signal involves using the network model to simulate the behavior of the cable network in response to the input signal, and
   wherein the method further comprises:
      calculating frequency domain intermodulation components by effecting convolutions of spectra of the constituent signal components of the input signal, and
      using the frequency domain intermodulation components, in addition to the output signal, to produce the signal quality measure.

2. The method according to claim 1, wherein each convolution of spectra of constituent signal components is effected by carrying out an inverse Fourier transform, a multiplication in the time domain, and a Fourier transform.

3. The method according to claim 1, wherein the network model is a frequency domain model.

4. The method according to claim 1, wherein the component model comprises two intermodulation units for determining second order and third order intermodulations respectively.

5. The method according to claim 1, wherein the at least one intermodulation unit is preceded by a primary weighing unit for weighing the input signal prior to determining the intermodulations, and is followed by a secondary weighing unit for weighing the intermodulations.

6. The method according to claim 1, wherein the weighing units comprise second-order weighing functions.

7. The method according to claim 1, wherein the weighing units comprise parameters determined by a genetic algorithm.

8. The method according to claim 1, wherein the at least one intermodulation unit comprises intermodulation sub-units for determining intermodulations of the constituent signal components.

9. The method according to claim 1, wherein the intermodulation units and/or the intermodulation sub-units are arranged for carrying out convolutions of spectra of the constituent signal components.

10. The method according to claim 1, wherein the signal quality measure is a signal-to-noise ratio and/or a bit error ratio.

11. The method according to claim 1, wherein each signal component represents a class of input signals.

12. The method according to claim 1, comprising:
measuring signals produced by a physical component modelled by the component model;
determining a difference between the computed signals produced by the component model and the measured signals;
adjusting parameters of the component model dependent on the difference.

13. A non-transitory computer-readable medium including computer-executable instructions for determining signal quality in a network, the computer-executable instructions facilitating performing, for a provided network model comprising interconnections and at least one component model and a provided input signal, the steps of:
determining an output signal using the input signal and the network model, and
determining a signal quality measure using the input signal and the output signal,
wherein:
the network model is a model of a cable network,
the input signal comprises multiple frequency domain representations of constituent signal components,
the output signal comprises a frequency domain representation of a cable network output signal, and
the step of determining the output signal involves using the network model to simulate the behavior of the cable network in response to the input signal, and
wherein the executable instructions further facilitate performing the steps of:
calculating frequency domain intermodulation components by effecting convolutions of spectra of the constituent signal components of the input signal (IS), and
using the frequency domain intermodulation components, in addition to the output signal, to produce the signal quality measure, and
wherein, the component model comprises a gain unit, weighing units, and at least one intermodulation unit for determining a component's gain contribution, frequency dependencies and intermodulation contributions respectively.

14. A device for determining signal quality in a network, the device comprising:
a memory unit for storing a network model comprising interconnections and at least one component model, the component model comprises a gain unit, weighing units, and at least one intermodulation unit for determining a component's gain contribution, frequency dependencies and intermodulation contributions respectively;
an input unit for providing an input signal;
a processing unit for determining an output signal using the input signal and the network model;
a signal quality unit for determining a signal quality measure using the input signal and the output signal;
wherein:
the network model stored in the memory unit is a model of a cable network,
the input unit is arranged for receiving an input signal comprising multiple frequency domain representations of constituent signal components,
the processing unit is arranged for determining an output signal comprising a frequency domain representation of a cable network output signal, and
the processing unit is further arranged for determining the output signal by using the network model to simulate the behavior of the cable network in response to the input signal, and
wherein the processing unit is further arranged for:
calculating frequency domain intermodulation components by effecting convolutions of spectra of the constituent signal components of the input signal, and
using the frequency domain intermodulation components, in addition to the output signal, to produce the signal quality measure.

15. The device according to claim 14, wherein the processing unit is further arranged for effecting each convolution of spectra of constituent signal components by carrying out an inverse Fourier transform, a multiplication in the time domain, and a Fourier transform.

16. The device according to claim 14, comprising
an input for receiving signals from a physical component;
a parameter adjustment unit configured to adjust parameters of the component model dependent on a difference between the computed signals produced by the model and measured signals from the input.

* * * * *

UNITED STATES PATENT AND TRADEMARK OFFICE
CERTIFICATE OF CORRECTION

PATENT NO. : 8,467,307 B2
APPLICATION NO. : 12/528575
DATED : June 18, 2013
INVENTOR(S) : Jeroen Jacob Boschma It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this
Eighth Day of September, 2015

Michelle K. Lee
*Director of the United States Patent and Trademark Office*